(12) United States Patent
Shi

(10) Patent No.: US 10,070,625 B2
(45) Date of Patent: Sep. 11, 2018

(54) MULTIFUNCTIONAL DOG CHAIN

(71) Applicant: Jinhua Solid Tools Co., Ltd, Jinhua, Zhejiang (CN)

(72) Inventor: Fuyou Shi, Zhejiang (CN)

(73) Assignee: Jinhua Solid Tools Co., Ltd, Jinhua (CN)

( * ) Notice: Subject to any disclaimer, the term of this patent is extended or adjusted under 35 U.S.C. 154(b) by 157 days.

(21) Appl. No.: 15/174,997

(22) Filed: Jun. 6, 2016

(65) Prior Publication Data

US 2017/0325425 A1 Nov. 16, 2017

(30) Foreign Application Priority Data

May 10, 2016 (CN) .......................... 2016 1 0309295

(51) Int. Cl.
*A01K 27/00* (2006.01)
*F16B 2/06* (2006.01)

(52) U.S. Cl.
CPC ............ *A01K 27/003* (2013.01); *F16B 2/065* (2013.01); *A01K 2227/10* (2013.01)

(58) Field of Classification Search
CPC ... A01K 27/003; A01K 27/005; A01K 27/006
USPC ....... 119/795, 769, 792, 712, 772, 779, 793, 119/905, 907, 770
See application file for complete search history.

(56) References Cited

U.S. PATENT DOCUMENTS

| | | | | |
|---|---|---|---|---|
| 4,892,063 A * | 1/1990 | Garrigan | .............. | A01K 27/003 119/795 |
| 5,632,234 A * | 5/1997 | Parker | .................. | A01K 27/003 119/795 |
| 5,701,848 A * | 12/1997 | Tozawa | ................ | A01K 27/003 119/795 |
| 5,732,662 A * | 3/1998 | Jacobsen | .............. | A01K 27/003 119/798 |
| 5,740,764 A * | 4/1998 | Jacobsen | .............. | A01K 27/003 119/792 |
| 5,852,988 A * | 12/1998 | Gish | ..................... | A01K 27/003 119/795 |
| 5,915,336 A * | 6/1999 | Watson | ................ | A01K 27/005 119/797 |
| 6,237,539 B1 * | 5/2001 | Sporn | .................. | A01K 27/003 119/771 |
| 6,439,168 B1 * | 8/2002 | Maglich | ............... | A01K 27/003 119/792 |
| 6,530,131 B1 * | 3/2003 | Hopkins | ................... | A45F 5/00 24/3.13 |

(Continued)

*Primary Examiner* — Yvonne Renee Abbott-Lewis

(57) ABSTRACT

A multifunctional dog chain includes at least two ropes, a handle ring and hooks. Rear ends of the at least two ropes are interconnected to form a first connecting portion, the handle ring is in 360° rotary connection with the first connecting portion, front ends of the ropes are separated, the hooks used for connecting with dog collars are arranged on each of said ropes, an adjustable rope clamp is arranged between the ropes and connected to the ropes to separate the ropes into a front part and a rear part, the ropes between the first connecting portion and the adjustable rope clamp form the closed rear part, each of the ropes in the front part is of a separated structure, and the adjustable rope clamp can move back and forth along said ropes. The multifunctional dog chain can prevent accidents out of too long ropes.

7 Claims, 2 Drawing Sheets

(56) References Cited

U.S. PATENT DOCUMENTS

| | | | |
|---|---|---|---|
| 6,539,897 B1 * | 4/2003 | Dossenback | A01K 27/003 119/795 |
| 6,626,132 B1 * | 9/2003 | Mann | A01K 27/003 119/769 |
| 7,040,256 B2 * | 5/2006 | Wiggins | A01K 27/003 119/796 |
| 7,182,044 B1 * | 2/2007 | Blandford | A01K 27/003 119/796 |
| D615,253 S * | 5/2010 | Goodell | D30/153 |
| 8,955,465 B1 * | 2/2015 | VanDommelen | A01K 27/003 119/795 |
| 9,032,911 B2 * | 5/2015 | Hill | A01K 27/003 119/795 |
| 2003/0145802 A1 * | 8/2003 | Morgan | A01K 27/006 119/795 |
| 2010/0050949 A1 * | 3/2010 | Hsieh | A01K 5/0114 119/61.56 |
| 2015/0090196 A1 * | 4/2015 | Fleming | A01K 27/003 119/795 |
| 2016/0073745 A1 * | 3/2016 | Moreau | A44C 11/005 24/11 R |
| 2017/0297656 A1 * | 10/2017 | Dodge | F16G 11/101 |

* cited by examiner

MULTIFUNCTIONAL DOG CHAIN

CROSS-REFERENCE TO PRIOR APPLICATION

This application claims the benefit of Chinese Patent Application No. 201610309295.X filed May 10, 2016, the contents of which are incorporated herein by reference.

TECHNICAL FIELD

The invention relates to the field of pet products, in particular to a multifunctional dog chain.

BACKGROUND

With the development of society and the improvement of people's living standard at present, people are constantly pursuing the spiritual life while enjoying material life. Keeping pet dogs gradually becomes a popular fashion, and walking dogs also becomes the daily work of many people. Dog chain is an indispensable tool for walking a dog. The structure of an existing dog chain generally includes a chain, one end of the chain is connected with a handle through a connecting piece, and the other end of the chain is connected with a dog collar connecting buckle through a dog collar connecting piece. The dog collar connecting buckle is buckled on the dog collar, and the dog collar is worn around the neck of the dog. However, when the number of dogs is more than one, multiple dog chains of such structure are required accordingly, the dog chains are likely to wind up while walking the dogs, thus the dog chains may hurt dogs easily.

SUMMARY OF THE INVENTION

The invention provides a multifunctional dog chain, overcoming the defects in the prior art that when the number of dogs of a user is more than one, multiple dog chains of the existing structure are required accordingly, the dog chains are likely to wind up while walking the dogs, thus the dog chains may hurt dogs easily.

The technical scheme of the invention is realized by:

a multifunctional dog chain, comprising at least two ropes, a handle ring and hooks. Rear ends of said at least two ropes are interconnected to form a first connecting portion, said handle ring is in 360° rotary connection with the first connecting portion, front ends of said at least two ropes are separated, said hooks used for connecting with dog collars are arranged on each of said ropes, an adjustable rope clamp is arranged between said at least two ropes and connected to said ropes to separate said ropes into a front part and a rear part, said ropes between said first connecting portion and the adjustable rope clamp form said closed rear part, each of said ropes in said front part is of a separated structure, and said adjustable rope clamp can move back and forth along said ropes. The multifunctional dog chain can control the separable length between the ropes in the front part by moving said adjustable rope clamp so as to control the distance between dogs, thus preventing safety accidents out of too long ropes resulting in winding-up or too large separation distance between dogs.

Further, said adjustable rope clamp comprises a clamp holder and a clamp plate, said clamp holder and the clamp plate are buckled to form at least two internal first housing cavities with variable volume to house said ropes, a limit structure is arranged between said clamp holder and the clamp plate, and said clamp plate can move upward along said limit structure, said clamp plate can move up and down relative to the clamp holder through said limit structure so as to clamp or release the ropes in said first housing cavities, thus the adjustable rope clamp can move back and forth along the ropes.

Further, said limit structure comprises a connecting pole fixedly connected with the clamp holder), a clamping knob and a spring, said connecting pole passes through the clamp plate, one end of said connecting pole is connected with said clamping knob, a groove is arranged on the inner wall of said clamp plate, said groove and the clamp holder form a second housing cavity for housing the spring, said spring is sheathed on said connecting pole and arranged in said second housing cavity. In operation, said clamping knob moves up and down relative to the connecting pole, and cooperates with the spring to realize relative motion between the clamp plate and the clamp holder so as to clamp or release the ropes in said first housing cavities.

Further, said clamping knob is fitted with the connecting pole in a screw joint manner.

Further, a rotary connection structure is arranged between said first connecting portion and the handle ring, said rotary connection structure comprises a raised connector at one end of the handle ring and a connecting piece, said raised connector and the end of the handle ring form a circular clamping groove, a circular connecting ring is arranged at one end of said connecting piece, the other end of said connecting piece is fixedly connected with the first connecting portion, said circular connecting ring is clamped in said circular clamping groove and can rotate along said circular clamping groove, thus realizing rotary connection between the handle ring and the first connecting portion. The rotary connection designed between the handle ring and the first connecting portion can improve control flexibility of the handle ring while walking dogs.

Further, a non-slip silicone sleeve is arranged on said handle ring to increase the grip comfort of users.

Further, a first soft rubber sleeve is arranged on said first connecting portion for fixedly connecting the rear end of each rope.

Further, a second soft rubber sleeve is arranged at the end of each of said ropes in said front part.

The beneficial effects of the invention are as follows:

a multifunctional dog chain of the invention comprises at least two ropes. An adjustable rope clamp is arranged between the ropes, and the separable length between the ropes in the front part can be controlled by moving the adjustable rope clamp so as to control the distance between dogs, thus preventing safety accidents out of too long ropes resulting in winding-up or too large separation distance between dogs. The multifunctional dog chain is easy to use.

BRIEF DESCRIPTION OF THE DRAWINGS

In order to make technical scheme in examples of the invention clearer, drawings used in the examples will be briefly introduced. Apparently, the drawings described below are only some examples of the invention. A person skilled in the art can obtain other drawings based on these drawings without creative work.

Where, 1—ropes; 2—handle ring; 3—hooks; 4—non-slip silicone sleeve; 5—first soft rubber sleeve; 6—raised connector; 7—connecting piece; 8—circular connecting ring;

9—adjustable rope clamp; 10—rear part; 11—front part; 12—clamp holder; 13—clamp plate; 14—first housing cavity; 15—connecting pole; 16—clamping knob; 17—spring; 18—groove; 19—second housing cavity; 20—second soft rubber sleeve.

DETAILED DESCRIPTION OF THE PREFERRED EMBODIMENTS

The technical scheme in the examples of the invention will be described in detail in combination with drawings in the examples of the invention. Obviously, the examples to be described are only some examples of the invention, but not all examples.

Example 1

Figure 1:
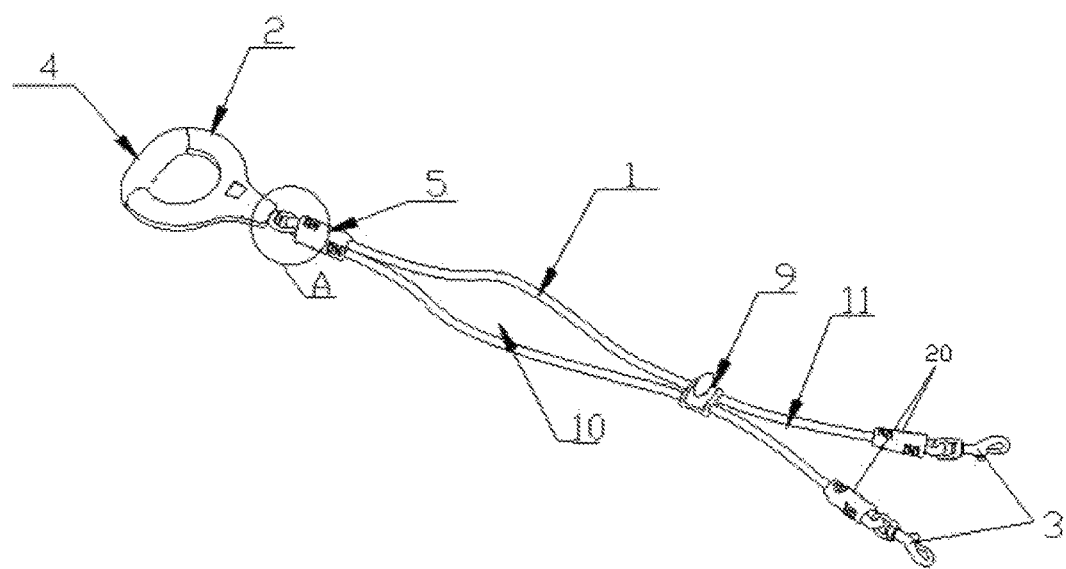
FIG. 1 is a structural diagram of a multifunctional dog chain of the invention.
Figure 2:
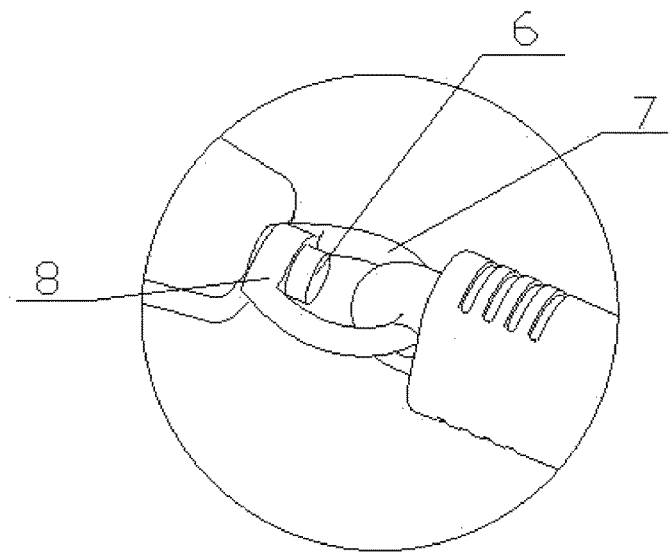
FIG. 2 is a structural diagram of detail A in FIG. 1.
Figure 3:
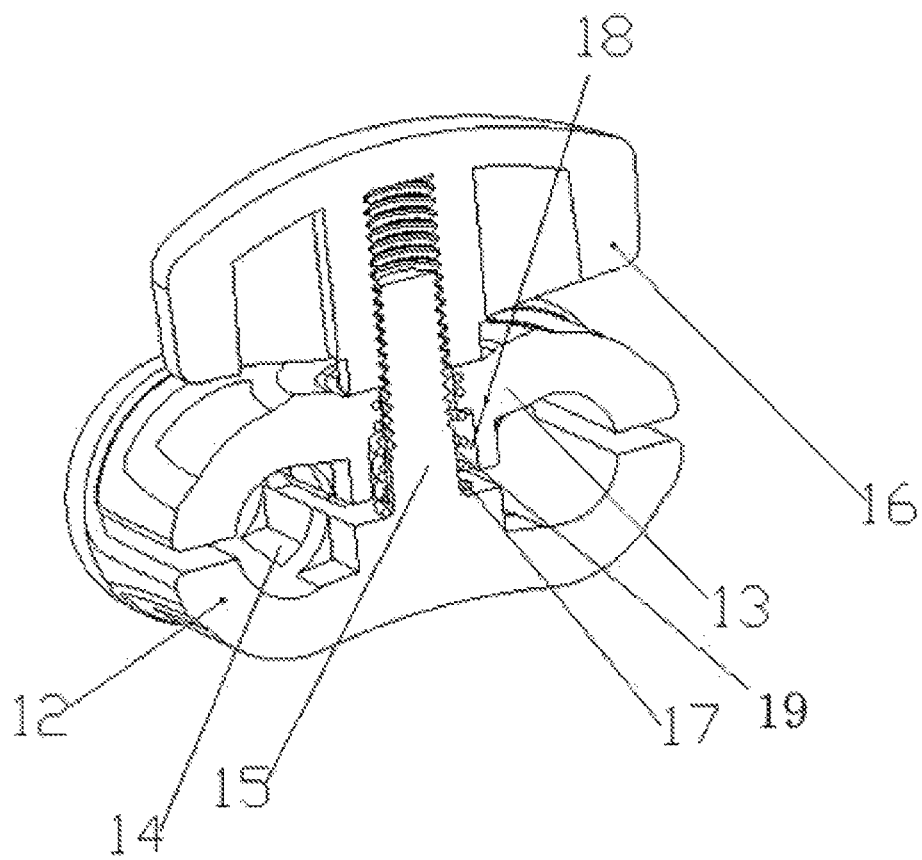
FIG. 3 is a sectional view of the adjustable rope clamp in FIG. 1.

As shown in FIG. 1 to FIG. 3, a multifunctional dog chain comprises at least two ropes (1), a handle ring (2) and hooks (3), a non-slip silicone sleeve (4) is arranged on the handle ring (2) to increase the grip comfort of users, a first soft rubber sleeve (5) is arranged at the end of each of the at least two ropes (1) to interconnect the ropes to form a first connecting portion, a rotary connection structure is arranged between the first connecting portion and the handle ring (2), the rotary connection structure comprises a raised connector (6) at one end of the handle ring (2) and a connecting piece (7), the raised connector (6) and the end of the handle ring (2) form a circular clamping groove, a circular connecting ring (8) is arranged at one end of the connecting piece (7), the other end of the connecting piece (7) is fixedly connected with the first connecting portion, the circular connecting ring (8) is clamped in said circular clamping groove to realize 360° rotary connection between the handle ring (2) and the first connecting portion. The rotary connection designed between the handle ring (2) and the first connecting portion can improve control flexibility of the handle ring (2) while walking dogs. Front ends of the at least two ropes (1) are separated, the hooks (3) used for connecting with dog collars are arranged on each of the ropes, an adjustable rope clamp (9) is arranged between the at least two ropes (1) and connected to the ropes to separate the ropes into a front part (11) and a rear part (10), the ropes between the first connecting portion and the adjustable rope clamp (9) form the closed rear part (10), each of the ropes in the front part (11) is of a separated structure, and the adjustable rope clamp (9) can move back and forth along the ropes. The separable length between the ropes in the front part (11) can be controlled by moving the adjustable rope clamp (9) so as to control the distance between dogs, thus preventing safety accidents out of too long ropes resulting in winding-up or too large separation distance between dogs.

The adjustable rope clamp (9) specifically comprises a clamp holder (12) and a clamp plate (13), the clamp holder (12) and the clamp plate (13) are buckled to form at least two internal first housing cavities (14) with variable volume to house said ropes, a limit structure is arranged between the clamp holder (12) and the clamp plate (13), and the clamp plate (13) can move up and down relative to the clamp holder (12) through the limit structure so as to clamp or release the ropes in said first housing cavities (14), thus the adjustable rope clamp (9) can move back and forth along the ropes. The limit structure comprises a connecting pole (15) fixedly connected with the clamp holder (12), a clamping knob (16) and a spring (17), the connecting pole (15) passes through the clamp plate (13), one end of the connecting pole (15) is connected with said clamping knob (16), a groove (18) is arranged on the inner wall of the clamp plate (13), the groove (18) and the clamp holder (12) form a second housing cavity (19) for housing the spring (17), the spring (17) is sheathed on said connecting pole (15) and arranged in said second housing cavity (19). In operation, the clamping knob (16) moves up and down relative to the connecting pole (15), and cooperates with the spring (17) to realize relative motion between the clamp plate (13) and the clamp holder (12) so as to clamp or release the ropes in said first housing cavities (14). The clamping knob (16) is fitted with the connecting pole (15) in a screw joint manner or in other manners, the adjustable rope clamp (9) can realize functions of the application with other structures, and a second soft rubber sleeve (20) is arranged at the end of each of the ropes (1) in the rear (11).

The above mentioned embodiments are only preferred embodiments of the invention and not used to limit the invention. Any modification, equivalent replacement and improvement made within the range of the spirit and rule of the invention shall be incorporated in the protection scope of the invention.

The invention claimed is:

1. A multifunctional dog chain, comprising at least two ropes (1), a handle ring (2) and hooks (3), wherein rear ends of said at least two ropes (1) are interconnected to form a first connecting portion, said handle ring (2) is in 360° rotary connection with the first connecting portion, front ends of said at least two ropes (1) are separated, and said hooks (3) used for connecting with dog collars are arranged on each of said ropes (1), and wherein an adjustable rope clamp (9) is arranged between said at least two ropes (1) and connected to said at least two ropes (1) to separate said ropes into a front part (11) and a rear part (10), said ropes between said first connecting portion and the adjustable rope clamp (9) form said closed rear part (10), each of said ropes in the front part (11) is of a separated structure, and said adjustable rope clamp (9) can move back and forth along said ropes;

wherein said adjustable rope clamp (9) comprises a clamp holder (12) and a clamp plate (13), said clamp holder (12) and the clamp plate (13) are buckled to form at least two internal first housing cavities (14) with variable volume to house said ropes, a limit structure is arranged between said clamp holder (12) and the clamp plate (13), and said clamp plate (13) can move upward along said limit structure.

2. The multifunctional dog chain according to claim 1, wherein said limit structure comprises a connecting pole (15) fixedly connected with the clamp holder (12), a clamping knob (16) and a spring (17), said connecting pole (15) passes through said clamp plate (13), one end of said connecting pole (15) is connected with said clamping knob (16), a groove (18) is arranged on the inner wall of said clamp plate (13), said groove (18) and the clamp holder (12) form a second housing cavity for housing the spring (17), said spring (17) is sheathed on said connecting pole (15) and arranged in said second housing cavity (19).

3. The multifunctional dog chain according to claim 2, wherein said clamping knob (16) is fitted with the connecting pole (15) in a screw joint manner.

4. The multifunctional dog chain according to claim 1, wherein a rotary connection structure is arranged between said first connecting portion and the handle ring (2), and comprises a raised connector (6) at one end of the handle ring (2) and a connecting piece (7), said raised connector (6) and the end of the handle ring (2) form a circular clamping groove, a circular connecting ring (8) is arranged at one end of said connecting piece (7), the other end of said connecting piece (7) is fixedly connected with the first connecting portion, said circular connecting ring (8) is clamped in said circular clamping groove and can rotate along said circular clamping groove.

5. The multifunctional dog chain according to claim 1, wherein a non-slip silicone sleeve (4) is arranged on said handle ring (2).

6. The multifunctional dog chain according to claim 1, wherein a first soft rubber sleeve (5) is arranged on said first connecting portion for fixedly connecting the rear end of each rope.

7. The multifunctional dog chain according to claim 1, wherein a second soft rubber sleeve (20) is arranged at the end of each of said ropes in said front part (11).

* * * * *